US007149315B2

(12) United States Patent
Johnston et al.

(10) Patent No.: US 7,149,315 B2
(45) Date of Patent: Dec. 12, 2006

(54) MICROPHONE ARRAY FOR PRESERVING SOUNDFIELD PERCEPTUAL CUES

(75) Inventors: James David Johnston, Morristown, NJ (US); Eric R. Wagner, South Plainfield, NJ (US)

(73) Assignee: AT&T Corp., New York, NY (US)

( * ) Notice: Subject to any disclaimer, the term of this patent is extended or adjusted under 35 U.S.C. 154(b) by 97 days.

(21) Appl. No.: 10/892,075

(22) Filed: Jul. 15, 2004

(65) Prior Publication Data

US 2004/0252849 A1 Dec. 16, 2004

Related U.S. Application Data

(63) Continuation of application No. 09/713,187, filed on Nov. 15, 2000, now Pat. No. 6,845,163.

(60) Provisional application No. 60/172,967, filed on Dec. 21, 1999.

(51) Int. Cl.
*H04M 11/00* (2006.01)

(52) U.S. Cl. .......................................... 381/92; 381/26

(58) Field of Classification Search .................. 381/92, 381/26, 122, 17–19, 91, 355, 356, 361
See application file for complete search history.

(56) References Cited

U.S. PATENT DOCUMENTS

| | | | | | |
|---|---|---|---|---|---|
| 5,260,920 | A | * | 11/1993 | Ide et al. | 381/63 |
| 5,600,727 | A | * | 2/1997 | Sibbald et al. | 381/26 |
| 5,666,425 | A | * | 9/1997 | Sibbald et al. | 381/26 |
| 6,118,875 | A | * | 9/2000 | Moller et al. | 381/1 |
| RE38,350 | E | * | 12/2003 | Godfrey | 381/92 |

* cited by examiner

*Primary Examiner*—Stella Woo
(74) *Attorney, Agent, or Firm*—Henry T. Brendzel

(57) ABSTRACT

A sound-capturing arrangement uses a set of directional microphones that lie approximately on a sphere having a diameter of 0.9 ms sound travel, which approximates the inter-aural time delay. Advantageously, one directional microphone points upward, one directional microphone points downward, and the odd number of microphones are arranged relatively evenly in the horizontal plane. On one embodiment, the signals from the microphones that point upward and downward are combined with the signals of the horizontal microphones before the signals of the horizontal microphones are transmitted or recorded.

2 Claims, 1 Drawing Sheet

MICROPHONE ARRAY FOR PRESERVING SOUNDFIELD PERCEPTUAL CUES

RELATED APPLICATION

This is a continuation of U.S. patent application Ser. No. 09/713,187, filed Nov. 15, 2000 now U.S. Pat. No. 6,845,163. This invention claim priority from provisional application No. 60/172,967, filed Dec. 21, 1999.

BACKGROUND

This invention relates to multi-channel audio origination and reproduction.

Increasing demands for realistic audio reproduction from consumers and music professionals, and the abilities of modern compression technology to store and deliver multichannel audio at bit rates that are feasible, as well as current consumer trends, show that multichannel (herein, more than two channels) sound is coming to consumer audio and the "home theater." Numerous microphone techniques, mixing techniques, and playback formats have been suggested, but a great deal of this effort has ignored the long-established requirements that have been found necessary for good perceived sound-field reproduction. As a result, soundfield capture and reproduction remains one of the key research challenges to audio engineers.

The main goal of soundfield reproduction is to reconstruct the spatial, temporal and qualitative aspects of a particular venue as faithfully as possible when playing back in the consumer's listening room. Artisans in the field understand, however, that exact soundfield reproduction is unlikely to be achieved, and probably impossible to achieve, for basic physical reasons.

There have been numerous attempts to capture the experience of a concert hall on recordings, but these attempts seem to have been limited primarily to the idea of either co-incident miking, which discards the interaural time difference, or widely spaced miking, which provides time cues that are not of the range 0 to ±0.9 msec, and thus provide cues that are either not expected by the auditory system or constitute contradictory information. The one exception appears to be binaural miking methods, and their derivatives, which do two-channel recording and which attempt to take some account of human head shape and perception, but which create difficulties both in the matching of the "artificial head" or other recording mount, and which do not allow the listener to sample the soundfield by small head movements. (Listeners unconsciously use small head movements to sample soundfields in normal listening environments.)

In the realm of multichannel audio, current mixing methods consist of either co-incident miking (ambiphonics) or widely spaced miking (the purpose being to de-correlate the different recorded channels), neither of which provides both the amplitude and time cues that the human auditory system expects.

SUMMARY OF THE INVENTION

Rather than capturing, and later reproducing, the exact soundfield, the principles disclosed herein undertake to reconstruct the listener-perceived soundfield. This is achieved by capturing the sound using a set of directional microphones that lie approximately on a sphere having a diameter of 0.9 ms sound travel. The 0.9 ms sound distance approximates the inter-aural time delay. Advantageously, one directional microphone points upward, one directional microphone points downward, and the remaining microphones (e.g., five of them) are arranged relatively evenly in the horizontal plane. On one embodiment, the signals from the microphones that point upward and downward are combined with the signals of the horizontal microphones before the signals of the horizontal microphones are recorded.

DETAILED DESCRIPTION

Figure 1:
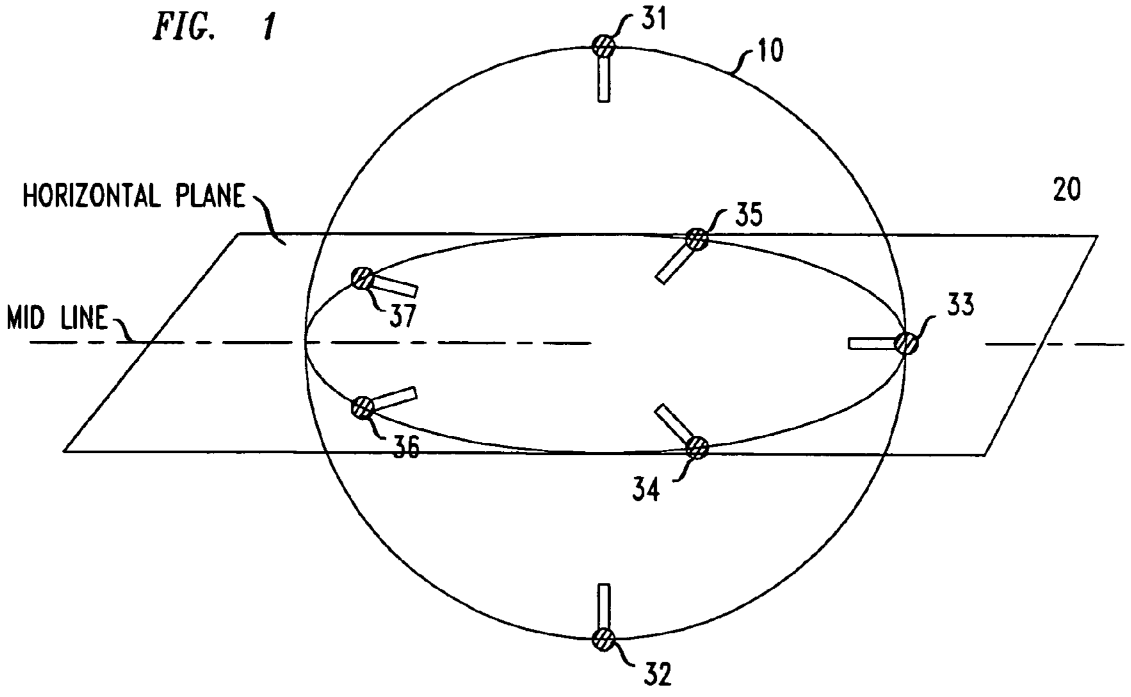
FIG. 1 presents an arrangement of microphones in accord with the principles of disclosed herein.

In connection with human perception of the direction and distance of sound sources, a spherical coordinates system is typically used. In this coordinate system, the origin lies between the upper margins of the entrances to the listener's two ear canals. The horizontal plane is defined by the origin and the lower margins of the eye sockets. The frontal plane is at right angles to the horizontal plane and intersects the upper margins of the entrances to the ear canals. The median plane (median sagittal plane) is at right angles to both the horizontal and frontal planes. In the context of this coordinate system, the angular position of an auditory event is described by $\gamma$, which is the distance between the auditory event and the center of origin; $\theta$, which is the azimuth angle; and $\delta$, which is the elevation angle.

Two cues provide the primary information for determining the angular position, $\gamma$, of a source. These are the interaural time difference and the interaural level difference between the two ears. The direction from where the sound is perceived to be coming can be rotated about the axis passing through the ear canals to create a "cone of confusion" that describes where the sound may come from. The localization to the cone of confusion can be done by either time or level cues, or both. At low frequencies, the interaural time difference is directly detectable by the human auditory system. At frequencies above 2 kHz to 3 kHz, this ability to synchronously detect the differences disappears, and the listener must rely, for time-stationary signals, on level differences created by the HRTF. For non-stationary signals that include a "leading edge", however, the ear is capable of using the envelope of the signal as an interaural time difference cue, allowing both time and level cues even at high frequencies.

Most of the interaural level difference lies in the effect of the diffraction of the sound wave around the listener's head. The sound shadow caused by the head is particularly important when the sound's wavelength is close to, or smaller than, the size of the head. Hence, the interaural level difference is frequency dependent; the shorter the wavelength (the higher the frequency), the greater the sound shadow and hence the larger the interaural level difference. As a result, interaural level difference works particularly well at high frequencies and is the main directional cue at high frequencies for signals with stationary energy envelopes. The interaural level difference is also directionally variable in $\delta$, varying with the position of the sound source in azimuth, which helps disambiguate the information from the "cone of confusion."

For sounds with a non-time-stationary energy envelope, the interaural time difference cue is not limited to low frequency signals detection. The ear is sensitive to the attacks and low frequency content in the envelope of complex sounds. In other words, the auditory system makes use of the interaural time difference in the temporal envelope of the sounds in order to determine the location of a sound source.

Particularly for sounds that happen to come from within the cone of confusion, the interaural time and level cues in general are not sufficient for three-dimensional sound localization. It is the binaural spectral characteristics of the signal due to head-related transfer functions (HRTFs) that help explain the human hearing mechanism when distinguishing between sound sources located in three-dimensional space, particular those located along a cone of confusion. When sound waves propagate in space and pass the human torso, shoulders, head and the outer ears (pinnae), diffractions occur and the frequency characteristics of the audio signals that reach the eardrum are altered. The spectral alternations of the input signals in different directions are referred to as the head-related transfer functions (HRTFs) in the frequency domain and head-related impulse response (HRIR) in the time domain. Because the wavelength of high frequencies is closer to the size of those small body parts, such as head and pinna, the spectral change in sounds is mostly limited to frequency components above 2 kHz. HRTFs vary in a complex way with azimuth, elevation, range and frequency. In general they differ from person to person as the amount of attenuation at different frequencies depends on the size and shape of the objects (such as pinna, nose and head) of the individual person. Head-related transfer functions are also directionally dependent and, for example, this usually causes more high frequency attenuation from sounds coming behind a person than those coming in front of the person. In general, there is a broad maximum near the ear canal resonance, 2–4 kHz for sound sources located in the median-sagittal plane. For frequencies above 5 kHz, the HRTFs are characterized by a spectrum notch, which occurs at a frequency varying with the position of the sound source. When the source is below, the notch appears near 6 kHz. The notch moves to higher frequencies when the source is elevated. However, when the source is overhead, the HRTF has a relatively flat spectrum and the notch disappears. In this invention, the system advantageously uses, for the horizontal plane, the HRTF of the listening individual to a much greater extent than "auralization" techniques. If a situation exists where the placement of "up" and "down" loudspeakers exists, it would also be preferential to use same, however most consumer situations prevent this extension of the techniques from being practical at the present time.

With this knowledge about the human auditory system, in accordance with the principles of this invention, a sound is recorded with the notion of capturing the sound elements as they are perceived by the human auditory system.

To that end, the sound-capturing arrangement disclosed herein employs a plurality of directional microphones that are arranged on a sphere having a diameter that approximately equals the distance that corresponds to the time that it takes a sound to travel from one ear to the other (approximately 0.9 msec). In this disclosure, this distance is referred to as the interaural sound delay.

FIG. 1 depicts one embodiment of a sound recording arrangement in accord with the principles disclosed herein. It includes seven microphones that are positioned in space to lie on a sphere 10. These microphones are each directional microphones that will capture the sound from a particular direction, with the time delay between microphones being determined by the effective location of the microphone capsule inside the microphone body. Sphere 10 is not a physical element, of course. It is just a convenient means for describing the spatial position of the microphones. The origin of the sphere lies in the above-mentioned horizontal plane, which in FIG. 1 is labeled 20. One of the microphones, 31, is positioned to point upward, basically perpendicular to the horizontal plane; and another of the microphones, 32, is positioned to point downward, also basically perpendicular to the horizontal plane. The remaining microphones are arranged along the intersection of the horizontal plane and the sphere (which is a great circle). One of those microphones faces the direction that is considered the "front" (the direction at which a listener would be facing, if the listener were to replace the microphones), and the remaining microphones are arranged symmetrically about the midline. With five microphones facing horizontally, an acceptable arrangement places the microphones 72° apart. With seven microphones facing horizontally, an acceptable arrangement is ±45°, ±90°, and ±150°. Although again, a center-front equal spacing will provide good results as well.

The number of microphones used is not critical. One can use, for example, the five horizontally-facing microphones employed in the FIG. 1 arrangement, without the "up" and "down" microphones. Of course, the performance would suffer because these microphones detect the reflections off the ceiling and floor, respectively, and those reflections are significant contributors to spatial effects and to the sense of distance. It is advantageous, though, to have an odd number of microphones that face horizontally, with one facing the front, as mentioned above. It is also marginally acceptable to use fewer than five, and desirable to use more than five, microphones in the horizontal plane, if the consumer deliver mechanisms exist. A minimum of three microphones, aimed to the front of the listener, are required in any case, meaning that one microphone is directed at the direction at which a listener would be facing, and the other two microphones are aimed at angles $\pm\alpha<90°$ away from that direction, such as with angles $\pm\alpha<30°$ or $\pm\alpha<45°$.

FIG. 1 depicts distinct directional microphones 31 through 37 but, actually, it has been found that the reception pattern of those microphones is what plays a more important role than the number of microphones, and if the desired pattern is best realized with a collection of individual microphones, use of such a collection is clearly acceptable. For purposes of this disclosure, in fact, such a collection is considered as a single microphone.

Figure 2:
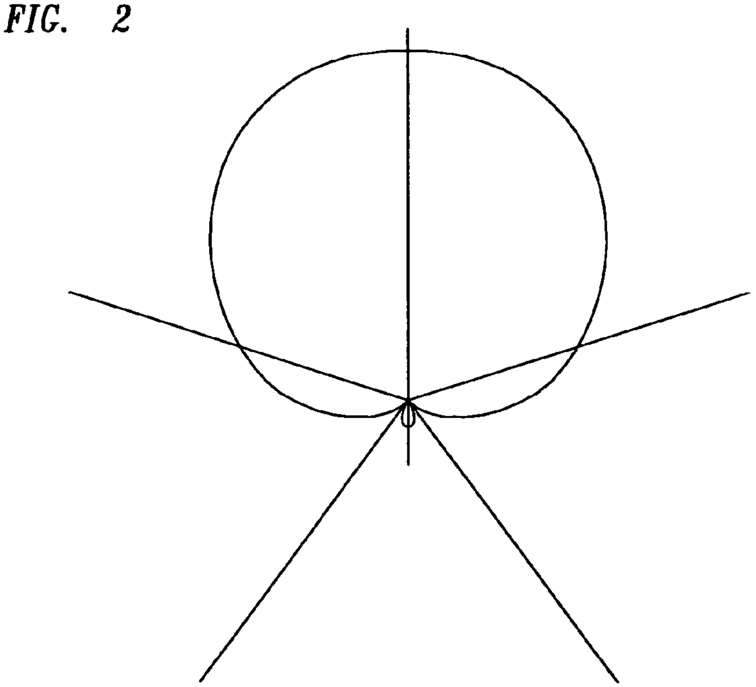
FIG. 2 illustrates a microphone sensitivity pattern of microphones used in the FIG. 1 arrangement.

As for the desirable reception pattern, it can be like the one depicted in FIG. 2. This pattern is characterized by a primary (front) lobe that is down 3 db by at a direction of the immediately neighboring microphone, and is down to effectively zero at a direction of the next-most immediate neighboring microphone (e.g., more than 40 db down). This pattern depicts the sensitivity of the microphone to arriving sounds. The microphone is said to point to a direction, that being the direction at which the microphone's sensitivity is greatest. Since FIG. 2 depicts the five horizontal microphones arrangement of FIG. 1 where the microphones are 72° apart, this requirement translates to a primary lobe that is down by 3 db at 72° and down to effectively zero at 144°. The microphones can also have a small back (possibly negative phase) lobe, but it is not required.

There may be occasions when it is desirable to record all of the received sound channels; that is, the signals of all seven of the FIG. 1 microphones. For example, if a listener is in a room that includes an ceiling speaker that faces down, and a floor speaker that faces up, both roughly above the listener's head and below the listener's feet, respectively, then it is most advantageous to record the signals of microphones 31–37 and to send the signal of microphone 31 to the ceiling speaker and the signal of microphone 32 to the floor speaker. Conversely, when it is expected to employ the recorded signals in a room with only five speakers, and, therefore the signals of microphones 31 and 32 need to be combined with the other five signals, then it makes more sense to combine the signals before storing, thereby saving on storage space. Of course, if the signals are merely transmitted to a remote location, the processing (i.e., combining) of signals can be done at the remote location.

Because microphones 31 and 32 are placed appropriately for capturing the time delay according to the human head, they can be folded easily into the signals of microphones 33–37, using the equation $$s'_{31} = s_{31} + \frac{1}{\sqrt{5}}(s_{31} + s_{32}),$$

without further processing for HRTF and delay. If a superior result is desired, one can add some processing for both mike and listener's effective HRTF's, but this has been proven in practice to be very well approximated by the simple sum of components.

The invention claimed is:

1. A sound recording arrangement comprising:

an N plurality of directional microphones, when N is equal to or greater than 3, situated nominally on a common plane, at points nominally on a circle having a diameter that corresponds to a sound time-of-arrival difference of approximately 0.9 msec between a pair of said directional microphones that is diametrically situated from each other, where said plurality of directional microphones, as a group, are more sensitive to sound arriving from a front direction of said arrangement than from any other direction; and means for communicating signals of said microphones to other equipment.

2. A sound recording arrangement comprising:

a plurality of at least three microphones situated nominally on a common plane, at points nominally on a circle having a diameter that corresponds to a sound time-of-arrival difference of approximately 0.9 msec between a pair of microphones that is diametrically situated from each other; and means for communicating signals of said microphones to other equipment where no microphones connected to said means that are nominally on said common plane are on other than said circle; where said N plurality of microphones is arranged along said circle to be substantially symmetrical about a mid-line that traverses said circle in said common plane and passes a center point of said circuit, and substantially asymmetrical about a diameter of said circle that is perpendicular to said mid-line;

said plurality of microphones includes a microphone whose direction of maximum sensitivity point substantially bisects an angle formed by to directions lying on a horizontal plane points to a front direction;

others of said microphones that point to directions lying on a horizontal plane are paired up, and each pair j is pointed to directions $\pm\alpha_i$, where $\alpha_i \neq \alpha_j$ when i≠j; and sensitivity of a microphone that points at direction $\alpha_I$ has a sensitivity at direction $\alpha_{I\pm1}$ that is down 3 db from said sensitivity at direction $\alpha_I$, and said sensitivity of a microphone that points at direction $\alpha_I$ has a sensitivity at direction $\alpha_{I\pm2}$ that is more than 40 db down from said sensitivity at direction $\alpha_I$.

* * * * *